Feb. 3, 1970  H. L. CUNNINGHAM ET AL  3,492,897
AUTOMATIC MACHINE TOOL CONTROL MECHANISM
Filed June 14, 1966  5 Sheets-Sheet 3
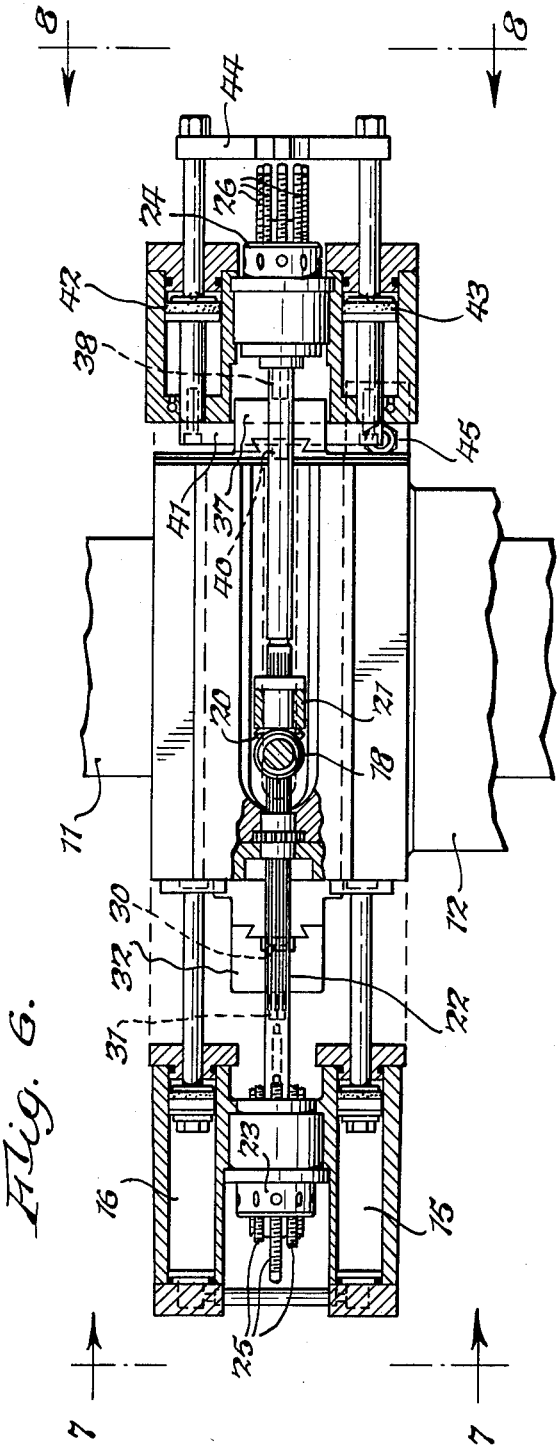
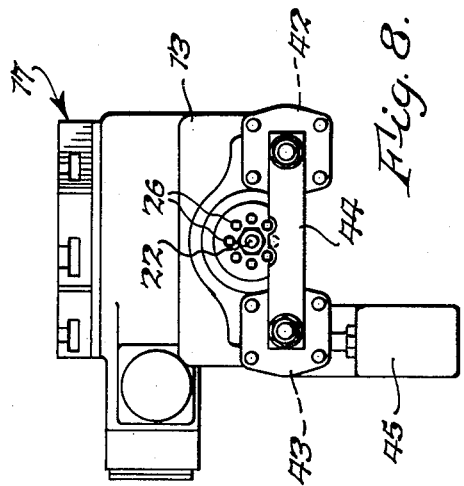
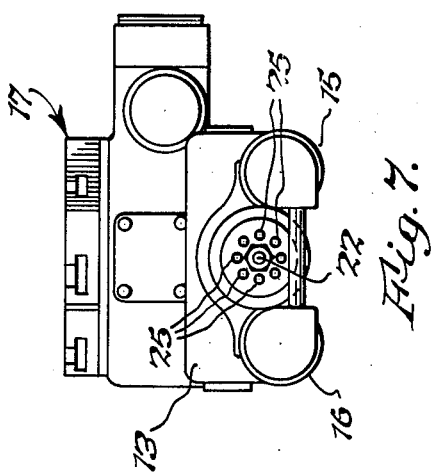

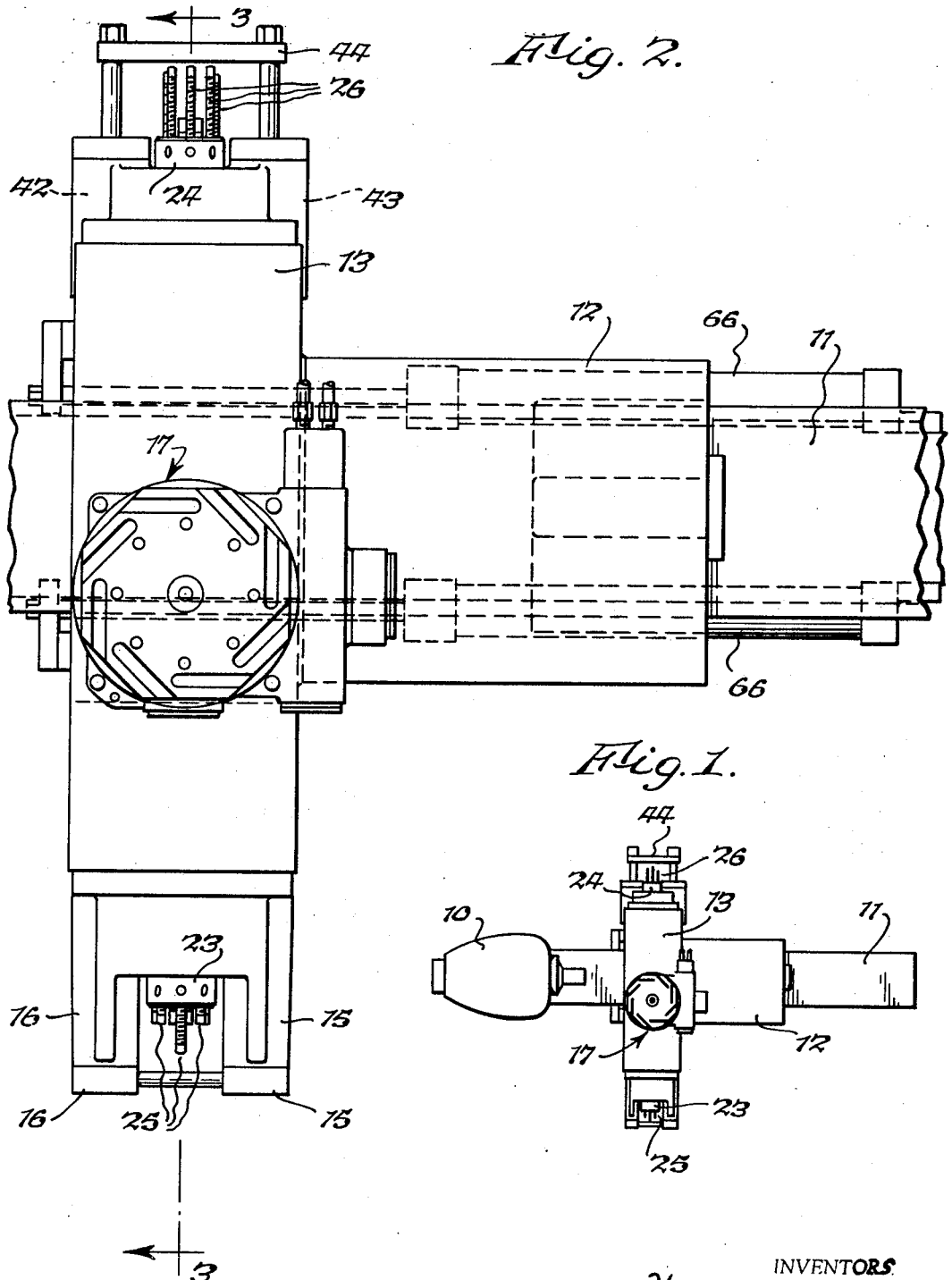

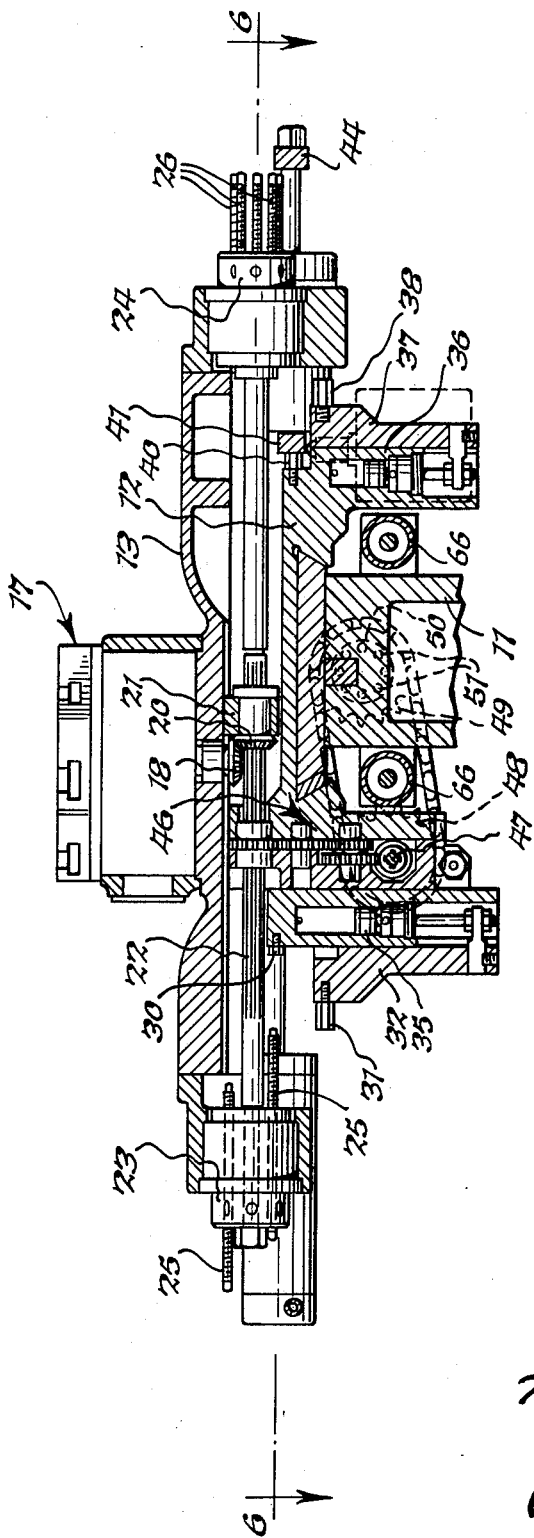

Feb. 3, 1970    H. L. CUNNINGHAM ET AL    3,492,897
AUTOMATIC MACHINE TOOL CONTROL MECHANISM
Filed June 14, 1966    5 Sheets-Sheet 4
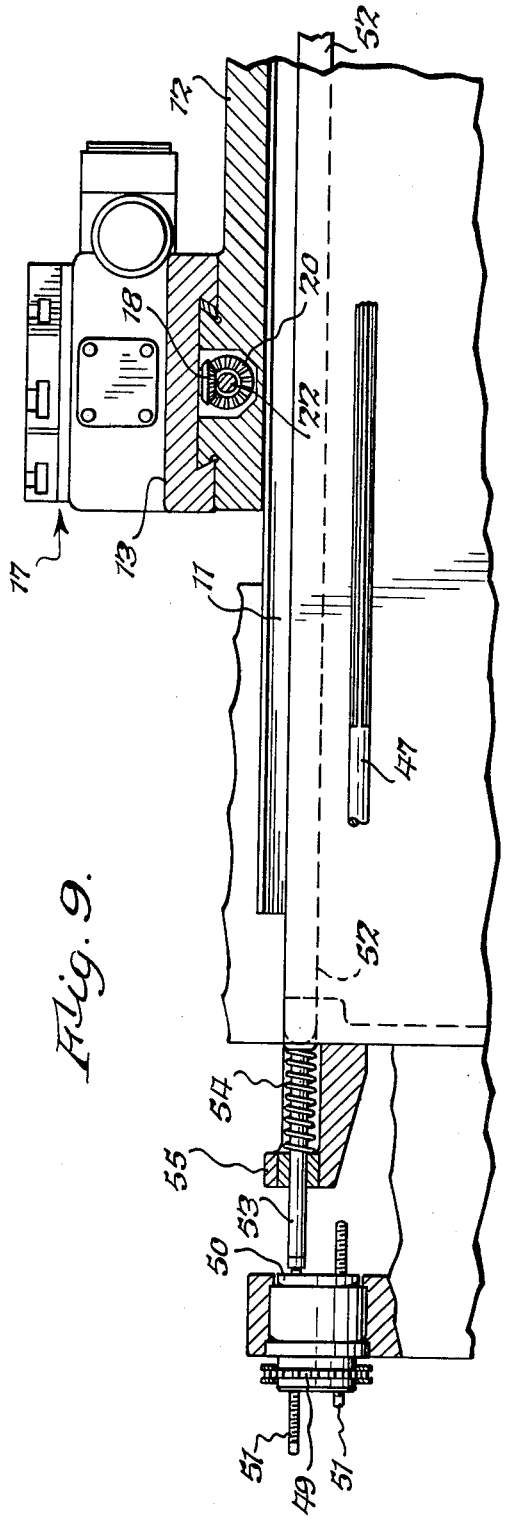
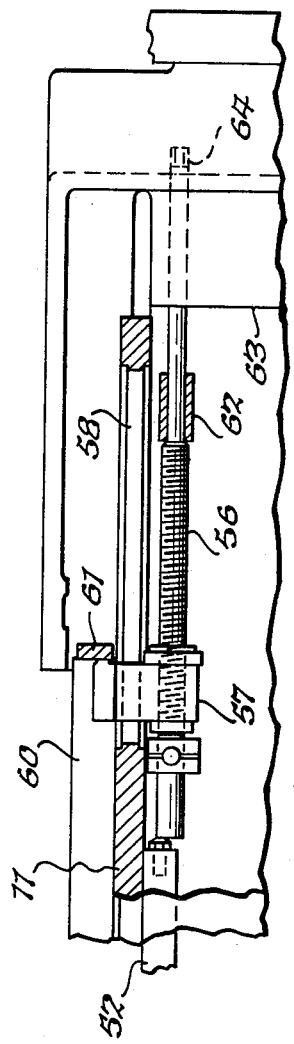
INVENTORS
Henry L. Cunningham
BY Ernest P. Mohr
Parker Buchman
ATTORNEYS.

United States Patent Office 3,492,897
Patented Feb. 3, 1970

3,492,897
AUTOMATIC MACHINE TOOL CONTROL
MECHANISM
Henry L. Cunningham and Ernest P. Mann, Horseheads, N.Y., assignors to Hardinge Brothers, Inc., Elmira, N.Y.
Filed June 14, 1966, Ser. No. 557,444
Int. Cl. B23b 21/00, 3/36
U.S. Cl. 82—21                                    3 Claims

ABSTRACT OF THE DISCLOSURE

This disclosure relates to machine tools such as lathes having a carriage on which a cross slide is employed with a turret mounted thereon and which is capable of operating at a greater accuracy and higher efficiency than similar machine tools heretofore constructed and provided with mechanical means for controlling the feed and traverse speeds of the turret.

---

This invention relates to machine tools such as lathes having a carriage on which a cross slide is employed with a turret mounted thereon.

An object of this invention is to provide a machine tool of this type capable of operating at a greater accuracy and higher efficiency than similar machine tools heretofore constructed.

An object is to provide a machine tool with auxiliary stops to shorten travel of the cross slide back and forth and save in overall time in machining certain jobs.

It is also an object of this invention to provide a machine tool of this type with improved stops and control means for controlling the rate of movements of the carriage and the cross slide in relation to each position as the turret is indexed.

In the accompanying drawings:

FIG. 1 is a top plan view of a part of a lathe to which improvements embodying this invention may be applied.

FIG. 2 is a fragmentary, top plan view thereof on an enlarged scale.

FIG. 3 is a transverse, sectional elevation thereof on line 3—3, FIG. 2.

FIG. 4 is a fragmentary view, partly in section, of a part of the mechanism at the left hand side of FIG. 3, but showing the parts 32 and 37 in different positions.

FIG. 5 is a fragmentary, sectional view of a portion of the right part of FIG. 3, also showing the parts 37 and 38 in different positions.

FIG. 6 is a longitudinal, sectional plan view on line 6—6, FIG. 3.

FIG. 7 is a fragmentary end elevation thereof as seen from line 7—7, FIG. 6.

FIG. 8 is another end elevation of the opposite end of the machine as seen from line 8—8, FIG. 6.

FIG. 9 is a partial fragmentary, sectional view of the left hand side of FIG. 3.

FIG. 10 is a continuation of FIG. 9.

Figure 11:
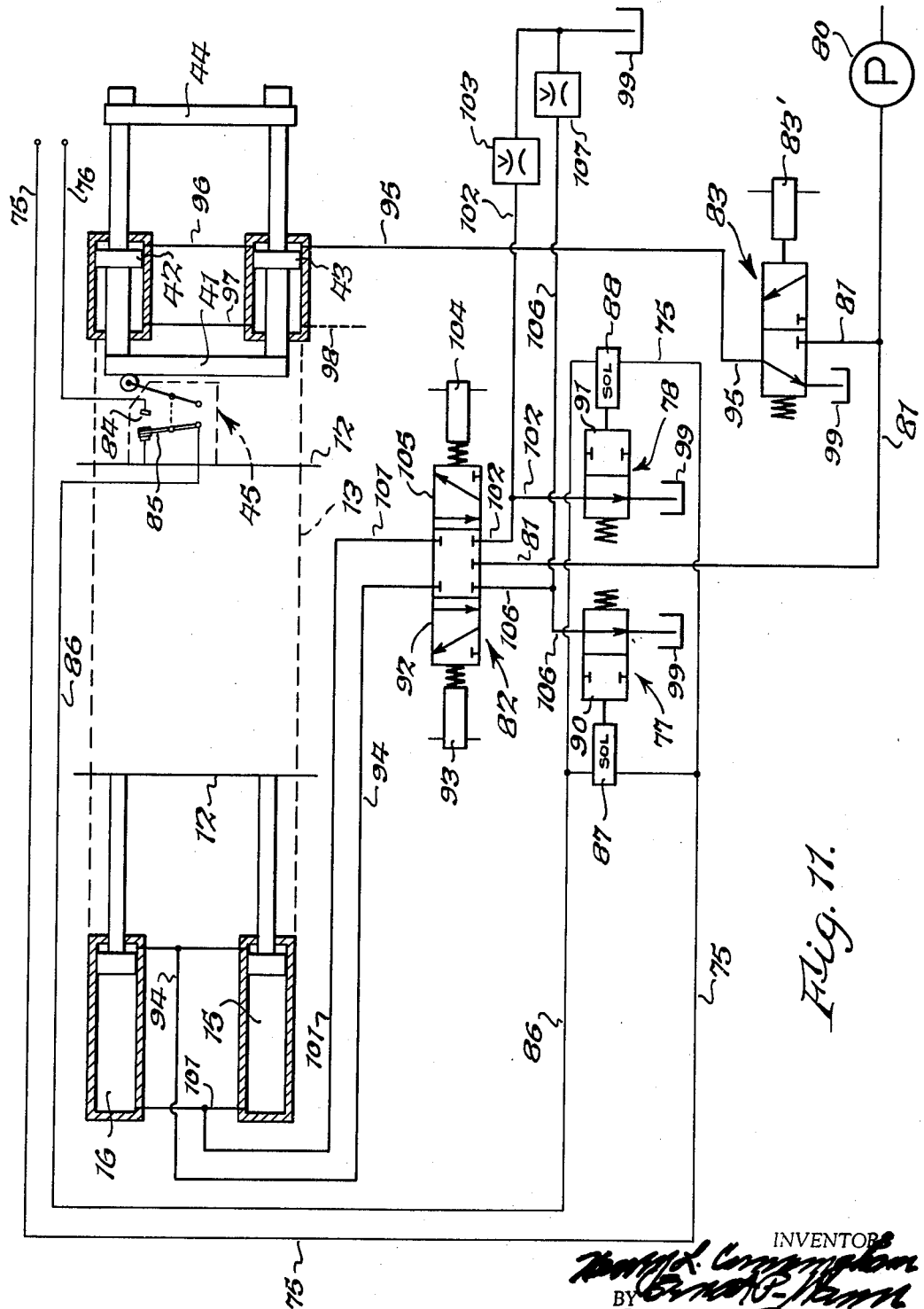
FIG. 11 is a diagrammatic view showing the connections between various parts of the machine tool.

The machine tool to which this invention is applied by way of example, is a lathe, as shown in FIG. 1, having a headstock 10 mounted on a bed 11 in any usual manner. A carriage 12 is mounted for movement lengthwise of the bed and has a cross slide 13 mounted thereon for movement crosswise of the bed of the lathe. The carriage 12 may be moved lengthwise of the bed in any suitable manner, such as heretofore commonly employed, for example, as hydraulic units. The cross slide is mounted on the carriage 12 to move transversely thereof, by means of a pair of hydraulic units having cylinders 15 and 16, as shown in FIGS. 6 and 7.

The machine tool has a turret 17 mounted on the cross slide which, in the particular construction shown has provisions for mounting cutting tools at eight positions thereon, none of these tools being shown, but it will be understood that turrets for accommodating a different number of cutting tool positions may be provided. It must also be assumed that the turret mechanism would be power indexed through any suitable means. such as a Geneva action indexing device. The turret is mounted in a bearing for rotation on one upright axis and has a bevel gear 18 secured thereto which meshes with another bevel gear 20 rotatably mounted in a bearing 21. This bevel gear 20 is applied to fit on a spline shaft 22. At the opposite ends of this shaft stop drums 23 and 24 are secured to rotate with this shaft and the drums are mounted to rotate in bearings on the cross slide 13. Each drum has a series of stop screws adjustably mounted therein corresponding to the number of tool positions of the turret. The stop drum 23 has stop projections, such as screws 25, mounted therein, and the drum 24 is similarly provided with stop screws 26. These stop screws have threaded engagement with their drums and may be adjusted lengthwise of the drums independently of each other. The adjustment of these stop screws 25 is to povide for making certain depths of cuts in the workpiece, and because of the connections of the drums 23 and 24 with the turret, each screw 25 and 26 will be identified with one of the tool positions on the turret.

The stop screws 26 are adjustable on the drum 24 to control the traverse movement of the cutting tool up to the workpiece and this traverse movement will be interrupted when the cutting tool is in a position to feed into the work at a cutting speed for each individual operation.

The stop screws 25 may engage a stop 30 mounted on the carriage 12 or, if desired, a second stop 31 mounted on a slide 32, may be moved into alignment with the path of movement of the stop screw 25 which is then in operative position for cooperation with a workpiece. By means of the alternate stops 30 and 31, the diameter, depth of cut, etc. of the workpiece which is being machined, may be varied. The movement of the slide 32 carrying the second stop may be controlled by means of a fluid pressure actuated mechanism including a piston 35 having a piston rod rigidly connected with the lower end of the slide 32, as clearly shown in FIG. 3. A similar double-acting cylinder 36 is provided near the other end of the carriage which contains a piston rod which moves a slide 37 carrying a second stop 38 upwardly into a position of alignment with a stop 40 mounted on the lathe carriage 12. At the rear end of the carriage 12, shown at the right hand side of the various views, the stops 38 and 40 are engaged by a cross bar 41 which in effect provides a transverse stop mechanism and comprises a pair of fluid operated units including pistons 42 and 43 each of which may be connected at one end in the cross bar 41 and the other end to a rear end cross bar 44. This rear end cross bar 44 engages with the stop screws 26 of the drum 24. These stop screws 26 have threaded engagement with the drum 24 and may be adjusted lengthwise to determine the length of travel of the cross bar 44 and its pistons 42 and 43. One of the purposes of this traverse stop mechanism is to determine the traverse movements of the cross slide and the corresponding movements of the cutting tool for whatever distance is required before the slower or cutting speed movements of the cutting tool begin.

In the positions of the parts of the mechanism as shown in FIG. 3, the cross slide 13 is in its forward or home position and the stop bar 41 is in engagement with the stop 40 mounted on the lathe carriage. If fluid pressure is admitted into the right hand ends of the cylinders of the pistons 42 and 43, the cross slide and the cutting tool will be moved toward the workpiece at a traverse rate such that the pressure bar 41 bears against the stop 40. This is permitted by the cylinders 15 and 16 by means of a bypass and an adjustable needle valve on the exhaust side of the hydraulic circuits connected with cylinders 15 and 16. When the bar 44 engages one of the stop screws 26, the traverse rate of movement stops and the feed rate is taken over by the cylinders 15 and 16, and machining takes place until one of the stop screws 25 engages the stop 30 or 31.

In FIG. 8 a switch 45 is shown which cooperates with the stop bar 41. This switch is used in an electrical and hydraulic circuit, FIG. 11, to control a bypass valve in a conduit leading to the cylinders 15 and 16. When the bar 41 moves to the right, the cross slide goes into feed rate movement.

In FIG. 9 is shown a longitudinal, central, sectional view of the lathe illustrating a longitudinal stop mechanism for stopping the lathe carriage 12 at different distances from the headstock or workpiece. This includes a drum 50 provided with stop screws 51, only two of which are shown. This drum is rotated in synchronism with the turret 17 in a manner similar to the drums 23 and 24 by means of mechanism shown in FIG. 3 and including a train of gears 46 transmitting rotation from the splined shaft 22 to a gear mounted on the shaft 47 extending to the left side of the lathe. This shaft has a sprocket 48 mounted thereon which cooperates with a chain connected to another sprocket 49 mounted on the stop drum 50, so that this stop drum is driven in synchronism with the turret and the other stop drums.

A bar 52 is slidably secured under the lathe bed 11 and has a rod or extension 53 about which a coil spring 54 is arranged. This rod is guided by means of a bracket 55. The spring 54 urges the bar 52 to the right in FIGS. 9 and 10. This bar abuts against a screw threaded bar 56 which has a threaded engagement with a nut 57 slidable in a slot 58 in the lathe bed and has an upwardly extending part which projects into a slot 60 of the carriage 12 in position to be engaged by a bar 61 secured to the right hand end of the carriage 12. This stops further movement of the carriage in a feeding direction to the left in FIGS. 9 and 10.

The screw bar 56 carries a stop collar 62 which, when moved to the right in FIG. 10, may engage with a face 63 of a fixed part of the lathe frame. An extension of the bar 56 has an end 64 which extends beyond the lathe frame and to which a wrench may be applied to turn the screw bar 56.

The stop screws 51 will provide a small range of adjustment while the screw bar 56 and nut 57 make possible a long range adjustment at a distance from the headstock.

The carriage 12 is moved in either direction by hydraulic means including cylinders 66 and when moved to the right the bar 61 cooperates with the engaging nut 57, screw bar 56, bar 52 and extension 53 to move to the right by the urging of the spring 54 away from the stop screws 51. If the carriage moves farther to the right than shown in FIGS. 9 and 10, the stop collar 62 will stop the bar 56, and the carriage bar 61 will then move away from the nut 57.

When the next turret position comes up, the proper stop screws 51 will also come up and when the machining takes place by movement of the carriage to the left, it will stop when the extension 53 engages such stop screw 51.

When the turret has been brought to a stop after a machine operation has been completed, the movement to make a further operation may be effected manually or by automatic means which are well known and consequently not herein illustrated.

In the electrical hydraulic diagram shown in FIG. 11, the mechanical parts of the invention are shown in the same position as that in FIG. 6, the "home" position. This is with the cross slide to the extreme left toward the operator's side of the machine.

Current is supplied to the lines 75, 76 to power operate the solenoids of a pair of hydraulic bypass valves 77 and 78 which are shown in their normally open position.

Pump 80 supplies hydraulic fluid under pressure to a line 81 which leads to a valve 82 which supplies hydraulic power to the cross slide cylinders 15 and 16. The line 81 also supplies line pressure to a transferable stop valve 83, which connects to the cylinders of pistons 42 and 43.

The limit switch 45 is normally closed but as shown, is held in open position by its follower in engagement with the stop bar 41.

As soon as the stop bar moves to the right in FIG. 11, its contacts 84, 85 will close, and current will then flow from line 76 through the now closed contacts 84, 85 to the line 86 whereupon current flows through the valve solenoids 87, 88 back to the other side of the line 75, thus energizing them to shift their valve spools 90, 91 to a closed position.

These valves had been in open position just previously for traverse movement of the cross slide as will now be described.

Upon a signal initiating from either manual or automatic control, the cross slide valve 82 will be actuated into a cross slide "move" position 92, by means for example, of an air motor 93. Oil under pressure will then flow from the line 81 to line 94 behind the pistons in the cylinders 15 and 16. This will tend to move the cross slide 18 to the right except for the fact that at this time the transferable stop valve 83 has also been initiated into action by its air motor 83' which has shifted its valve spool into a power operating position. In this position oil pressure from line 81 flows to line 95 into the cylinders behind the pistons 42, 43 and also by line 96. As will be seen, this will move the carriage 13 to the right. Air on the exhaust side of pistons 42, 43 flows by lines 97, 98 to atmosphere.

We now have a condition where pistons 42, 43 push the stop bar 41 against the stop 40 and through this contact of the stop 40 being mounted on the cross slide 13, these pistons 42, 43 help move the cross slide 12 in addition to the piston cylinders 15 and 16 at traverse speed to the right.

The exhaust of cylinders 15 and 16 is now flowing through line 101, spool positions 92 of valve 82, line 102, bypass valve 78 to sump 99, this bypass valve 78 being in the deenergized position shown in FIG. 11.

Thus, there is nothing to restrict traverse movement of the cross slide to the right and the cutting tool approaches the work. As soon as bar 44 contacts one of the stop screws 26, piston cylinders 42 and 43 cannot move farther and the stop bar 41 moves with the cross slide 13 as a fixed part of it.

As soon as the stop bar 41 leaves the stop 40, the switch 45 closes its contacts 84, 85 and now the piston cylinders 15 and 16 will be the only motive power moving the cross slide in feed condition. As previously described, closing the contacts 84, 85 of switch 45 causes the spool of bypass valve 78 to move into a closed position. Thus the exhaust which had been free to flow to sump now is compelled to flow through line 102 to a choke valve 103 and then to sump 99. The setting of a choke valve 103 will determine how fast the carriage will feed the tool into the workpiece. The cross slide 13 will continue to move and the workpiece will be cut until one of the stop screws 25 engages a stop 30 or 31, whereupon this cut will be completed.

A "home" signal can now be initiated to return the cross slide back to the left. Air motor 104 is activated to move the spool of valve 82 into home position 105 whereupon oil will now flow from line 81, line 101, cylinders 15, 16 to move the cross slide to the left. Return oil now flows through line 94, valve 82, line 106, valve 77 to sump 99. The home signal will also shift the transferable stop valve 83 back to the position shown in FIG. 11 by deactivating its air motor 83′ and allowing oil from cylinder pistons 42, 43, flow-through lines 96, 95 through valve 83 to sump 99.

After cross slide 13 arrives at the "home" position, the turret will be activated to the next position and another cut will be initiated for that cutting tool.

A choke valve 107 is included in the line 106 so that feed cuts can be controlled when the carriage in used to cut from right to left such as when cutting an internal bore face.

It will be understood that various changes in the details, materials and arrangements of parts which have been herein described and illustrated in order to explain the nature of the invention may be made by those skilled in the art within the principle and scope of the invention as expressed in the appended claims.

We claim:

1. A control mechanism for a machine tool having a rotary spindle with means for mounting a workpiece thereon,
   a carriage movable toward and from said spindle, and a cross slide mounted on said carriage and on which a rotatable turret is mounted, said turret having a plurality of stations for cutting tools mounted thereon,
   a pair of drums rotatable on said cross slide step by step in synchronism with the rotation of said turret,
   one of said drums being mounted at each end of said cross slide,
   said drums having stop projections thereon corresponding to the stations of said turret and which are adjustable relatively to said drums to extend outwardly therefrom to variable distances in accordance with the distances to be travelled by said turret,
   stationary stops positioned on said carriage for cooperation with any of said stop projections of said drums,
   fluid actuated means at opposite ends of said cross slide and connected with each other,
   valve means for simultaneously admitting motive fluid to both of said fluid actuated means,
   said fluid actuated means at one side of said cross slide initially moving said cross slide at traverse speed toward said spindle,
   a choke valve for restricting the exhaust from said last mentioned fluid actuated means,
   and electrically controlled means actuated by the other fluid actuating means for restricting flow only through said choke valve to reduce speed of motion by said first fluid actuated means.

2. A control mechanism for a machine tool having a rotary spindle with means for mounting a workpiece thereon,
   a carriage movable toward and from said spindle, and a cross slide mounted on said carriage and on which a rotatable turret is mounted, said turret having a plurality of stations for cutting tools mounted thereon,
   a pair of drums rotatable on said cross slide step by step in synchronism with the rotation of said turret,
   one of said drums being mounted at each end of said cross slide,
   said drums having stop projections thereon corresponding to the stations of said turret and which are adjustable relatively to said drums to extend outwardly therefrom to variable distances in accordance with the distances to be travelled by said turret,
   stationary stops positioned on said carriage for cooperation with any of said stop projections of said drums,
   cylinders secured at each end of said cross slide and each containing a piston,
   a valve for admitting motive fluid to each of said cylinders,
   one of said cylinders moving said cross slide at traverse speed toward said spindle and toward one of said drums,
   the other of said cylinders having a piston rod connected therewith,
   one of said drums being arranged in spaced relation to the other end of said piston rod,
   an electric switch held in open position by the other end of said piston rod and which is closed when said piston rod is moved from its starting position,
   a check valve which controls exhaust from said first mentioned cylinder,
   and means actuated by said electric switch when closed to move said check valve into exhaust restricting position after predetermined movement of said cylinder and said cross slide,
   and means for stopping movement of said cross slide by a stop projection of a drum contacting with a stationary stop.

3. A control mechanism for a machine tool having a rotary spindle with means for mounting a workpiece thereon, a carriage movable toward and from said spindle, and a cross slide mounted on said carriage and on which a rotatable turret is mounted, said turret having a plurality of stations for cutting tools mounted thereof, that improvement which includes:
   a pair of drums rotatable on said cross slide step by step in synchronism with the rotation of said turret,
   one of said drums being mounted at each end of said cross slide,
   said drums having stop projections thereon corresponding to the stations of said turret and which are adjustable relatively to said drums to extend outwardly therefrom to variable distances in accordance with the distances to be travelled by said turret,
   stationary stops positioned on said carriage for cooperation with any of said stop projections of said drums,
   a cylinder secured at each end of said cross slide and each containing a piston,
   a valve for admitting motive fluid to each of said cylinders,
   means for interrupting the admission of motive fluid to one of said cylinders simultaneously with restricting the passage of active fluid to the other cylinder to reduce the speed of travel of said cross slide toward said spindle.

References Cited

UNITED STATES PATENTS 2,148,348   2/1939   Groene et al.   82—24 XR
2,172,999   9/1939   Hoelscher   82—24 XR

FOREIGN PATENTS 784,159   10/1957   Great Britain.

LEONIDAS VLACHOS, Primary Examiner

U.S. Cl. X.R.

82—24, 25, 34